United States Patent
Zoia et al.

(10) Patent No.: US 12,292,162 B2
(45) Date of Patent: May 6, 2025

(54) HYDROGEN REFUELING IR INTERFERENCE SHIELD

(71) Applicant: TOYOTA MOTOR ENGINEERING & MANUFACTURING NORTH AMERICA, INC., Plano, TX (US)

(72) Inventors: Giorgio L. Zoia, Los Angeles, CA (US); Hannah L. White, Redondo Beach, CA (US); Dallas K. Fox, Yorba Linda, CA (US); Jacquelyn A. Birdsall, Yorba Linda, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 17/700,957

(22) Filed: Mar. 22, 2022

(65) Prior Publication Data

US 2023/0304636 A1 Sep. 28, 2023

(51) Int. Cl.
*F17C 13/02* (2006.01)
*F17C 5/00* (2006.01)
*F17C 5/06* (2006.01)

(52) U.S. Cl.
CPC .............. *F17C 13/02* (2013.01); *F17C 5/007* (2013.01); *F17C 5/06* (2013.01);
(Continued)

(58) Field of Classification Search
CPC .... F17C 13/02; F17C 5/007; F17C 2250/034; F17C 2250/0491; F17C 2270/0178;
(Continued)

(56) References Cited

U.S. PATENT DOCUMENTS

| 8,346,090 B2 | 1/2013 | Ishikawa |
| 9,725,010 B2 | 8/2017 | Suzuki |
| (Continued) | | |

FOREIGN PATENT DOCUMENTS

| CN | 210183793 U | * 3/2020 |
| CN | 111878700 A | * 11/2020 |
| (Continued) | | |

OTHER PUBLICATIONS

CN-111878700-A English Translation of Specification (Year: 2022).*
(Continued)

*Primary Examiner* — Kenneth Rinehart
*Assistant Examiner* — Stephanie A Shrieves
(74) *Attorney, Agent, or Firm* — SHEPPARD, MULLIN, RICHTER & HAMPTON LLP; Daniel N. Yannuzzi

(57) ABSTRACT

An apparatus, namely an infrared (IR) interference shield, is described that can be utilized with a vehicle that employs hydrogen fueling, such as a fuel cell electric vehicle (FCEV). For example, the IR interference shield is mounted onto the vehicle's hydrogen fueling receptacle. The IR interference shield is distinctly structured to reduce or prevent interference of IR wireless communication between a vehicle-side IR transmitter on the receptacle, and an IR receiver of the hydrogen fueling station. The IR interference shield can block interference to IR signals that may negatively affect IR wireless communication between the hydrogen fueling station and the vehicle. Thus, the IR interference shield improves reliability of the communication between the vehicle and the hydrogen fueling station, thereby improving the overall effectiveness and efficiency of the hydrogen refueling process.

17 Claims, 6 Drawing Sheets

(52) U.S. Cl.
CPC *F17C 2203/0308* (2013.01); *F17C 2221/012* (2013.01); *F17C 2223/035* (2013.01); *F17C 2250/034* (2013.01); *F17C 2250/0491* (2013.01); *F17C 2270/0178* (2013.01); *F17C 2270/0184* (2013.01)

(58) Field of Classification Search
CPC .......... B60K 15/05; B60K 2015/03315; B60K 2015/0319; B60Q 1/2661
USPC .............................................. 141/4; 398/116
See application file for complete search history.

(56) References Cited

U.S. PATENT DOCUMENTS

| | | | |
|---|---|---|---|
| 10,030,816 | B2 | 7/2018 | Handa |
| 10,876,664 | B2 | 12/2020 | Kamimura |
| 12,111,017 | B2 * | 10/2024 | Yamamoto ............... F17C 5/007 |
| 2003/0081288 | A1 * | 5/2003 | Ishii ..................... H04B 10/114 |
| | | | 398/135 |
| 2008/0185912 | A1 * | 8/2008 | Tighe ....................... B60L 58/30 |
| | | | 429/444 |
| 2010/0247108 | A1 | 9/2010 | Ishikawa |
| 2011/0247726 | A1 * | 10/2011 | Okawachi ................. F17C 5/06 |
| | | | 141/82 |
| 2014/0170530 | A1 * | 6/2014 | Kawaura ................... F17C 7/00 |
| | | | 429/515 |
| 2014/0272671 | A1 * | 9/2014 | Handa ....................... B60L 3/12 |
| | | | 429/515 |
| 2016/0282187 | A1 * | 9/2016 | Sun ........................ B81B 7/0067 |
| 2017/0187056 | A1 * | 6/2017 | Kawaura ........... H01M 8/04082 |
| 2018/0375536 | A1 | 12/2018 | Emori |
| 2019/0379781 | A1 * | 12/2019 | Ma ........................ G09G 3/3406 |
| 2024/0247760 | A1 * | 7/2024 | Otaki ........................ F17C 5/06 |

FOREIGN PATENT DOCUMENTS

| | | | | |
|---|---|---|---|---|
| DE | 102016002176 | A1 * | 8/2017 | |
| JP | 2014119104 | A | 6/2014 | |
| JP | 2019007501 | A | 1/2019 | |
| KR | 20220033567 | A | 3/2022 | |
| WO | WO-2011092561 | A1 * | 8/2011 | ............ F17C 13/025 |

OTHER PUBLICATIONS

DE-102016002176-A1 English Translation of Specification (Year: 2022).*

CN-210183793-U English Translation of Specification (Year: 2024).*

* cited by examiner

HYDROGEN REFUELING IR INTERFERENCE SHIELD

TECHNICAL FIELD

The present disclosure relates generally to fuel cell electric technology, such as hydrogen fuel cell systems. In particular, an infrared (IR) interference shield can be used to achieve reduced IR signal interference during hydrogen refueling of vehicles.

DESCRIPTION OF RELATED ART

In order to combat negative impacts on the climate, cutting emissions associated with industry, transportation, motorized vehicles, and the like, can involve scaling a range of new clean energy technologies. One such emerging technology is hydrogen fueling. Hydrogen is a versatile fuel that can be used in a wide variety of applications, including industrial processes, as a transportation fuel or as energy storage for the power grid.

Particularly, hydrogen is among the cleanest fuels for powering vehicles. This is possible due to a sophisticated fuel cell technology that can be applied in electric vehicles using compressed hydrogen gas. In a fuel cell, hydrogen reacts electrochemically to produce electricity to power the vehicle, where the only waste product is water vapor.

BRIEF SUMMARY OF THE DISCLOSURE

In accordance with an embodiment of the disclosed technology, an infrared (IR) interference shield is implemented that reduces the impact of IR signal interference during hydrogen fueling of vehicles, such as fuel cell electric vehicles (FCEV) or hydrogen ground vehicles (HGV).

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

There are some electric vehicles that utilize hydrogen fuel cell systems, which produce electricity from a reaction between hydrogen and oxygen. For example, an electric vehicle with a fuel cell system can be fueled with hydrogen fuel at a hydrogen fueling station, in a manner that is similar to filling a conventional gas tank with gasoline or diesel at a filling station. The hydrogen fuel can be contained in high-pressure tanks and fed into a hydrogen fuel cell stack, where the hydrogen and the oxygen found naturally in the air react with each other and generate electricity.

Further, these electric vehicles with fuel cell systems can include specifically designed hydrogen fueling receptacles ("receptacles") for hydrogen refueling. Typically, such receptacles include infrared (IR) transmitters that are coupled to light duty vehicle receptacles. In addition, and due in part to the shape and size of parts around the receptacles on some vehicles, such as heavy-duty trucks, various types of IR interference that may impact signals from the receptacle's IR transmitter. Forms of IR interference that may be experienced near the receptacle can include but are not limited to interference from one or more additional IR transmitters; interference from natural light; interference caused by the hydrogen fueling station design and/or performance. Due to the IR interference that may be experienced near the receptacle, the IR communication between a vehicle on-board-H2 storage system and a hydrogen fueling station can become intermittent. In turn, this intermittent IR communication may ultimately lead to negative effects on the electric vehicle's performance, such as slow refueling and low state of charge (SOC).

Figure 1:
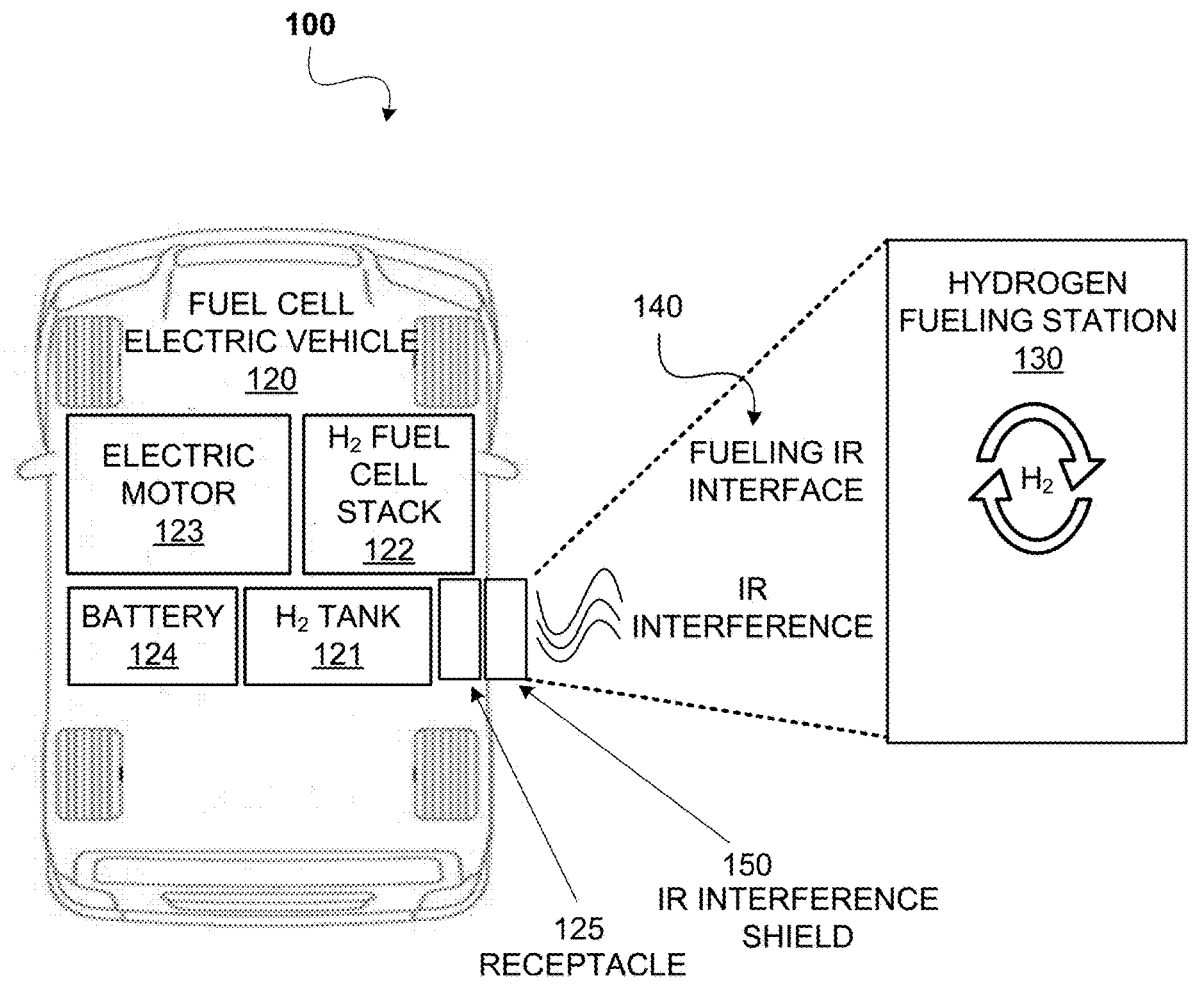
FIG. 1 is an example environment of a vehicle utilizing an infrared (IR) interference shield during hydrogen refueling, for example, in accordance with an embodiment of the technology disclosed herein.

FIG. 1 illustrates an example environment 100 in which a vehicle 120 implements the IR interference shield 150 to reduce wireless communication interference, such as IR interference, that may be experienced during hydrogen refueling. According to the embodiments, the vehicle 120 can be an electric vehicle that is primarily hydrogen powered, and thus has the capability of hydrogen refueling. For example, vehicle 120 can be a hydrogen-powered electric vehicle, such as a fuel cell electric vehicle (FCEV) or a hydrogen ground vehicle (HGV). Although the embodiments are described in reference to a personal electric vehicle (e.g., light duty vehicle), it should be appreciated that the disclosed features can also be used, where appropriate, with other forms of hydrogen-powered transportation vehicles, such as heavy-duty vehicles (e.g., buses), industrial trucks (e.g., forklifts) with compressed hydrogen storage, and the like.

As a hydrogen-powered electric vehicle, such as a FCEV, the vehicle 120 uses electricity to power an electric motor 123. However, in contrast to other electric vehicles, vehicle 120 can produce electricity using a fuel cell (shown in FIG. 1 as a hydrogen fuel cell stack 122) which is powered by hydrogen, rather than drawing electricity from only a battery, such as battery 124. The vehicle's 120 power may be defined by the size of the electric motor 123 that receives electric power from the appropriately sized hydrogen fuel cell stack 122 and battery 124, in combination. The vehicle 120 can also have plug-in capabilities to charge the battery 124. In some implementations, use of the battery 124 is for recapturing braking energy, providing extra power during short acceleration events, and to smooth out the power delivered from the hydrogen fuel cell stack 122 (with the option to idle or turn off the fuel cell during low power needs). The amount of energy stored onboard for the vehicle 120 can be determined by the size of the hydrogen fuel tank 121. This is different from an all-electric vehicle, where the amount of power and energy available are both closely related to the battery's size.

As seen in FIG. 1, the vehicle 120 has various internal components, which include, but are not limited to: a hydrogen ($H_2$) tank 121; a hydrogen ($H_2$) fuel cell stack 122; an electric motor 123; and a battery 124. With vehicle 120 implemented as an electric vehicle, the battery 124 can be a high-voltage battery that stores energy generated from regenerative braking and provides supplemental power to the electric motor 123. The electric motor 123 can use power from the hydrogen fuel cell stack 122 (and the battery 124) to operate and drive the vehicle's 120 wheels. In some implementations, the use electric motor 123 can perform both the drive and regeneration functions. The hydrogen fuel cell stack 122 of the vehicle 120 can be implemented as an assembly of individual membrane electrodes that use hydrogen and oxygen to produce electricity. The hydrogen fuel tank 121 stores hydrogen gas onboard the vehicle until it is consumed by the fuel cell stack 122.

The IR interference shield 150, as disclosed herein, is an apparatus that can be mounted onto the vehicle's 120 receptacle 125. In accordance with the embodiments, the IR interference shield 150 is distinctly structured to reduce or prevent interference of IR wireless communication between a vehicle-side IR transmitter (shown in FIG. 3) on the receptacle 125, and an IR receiver (shown in FIG. 3) of the hydrogen fueling station 130. For example, an IR receiver may be positioned on a fuel nozzle at the hydrogen fueling station 130 that is inserted into the vehicle's 120 receptacle 125 for hydrogen refueling. Thus, there is a mechanical connection between the hydrogen fueling station 130 and the vehicle's 120 hydrogen tank 121, which allows the hydrogen fueling station 130 to deliver its stored hydrogen fuel to fill the hydrogen tank 121 during hydrogen refueling. In addition, there is an IR wireless connection that is established between the vehicle (via the IR transmitter) and the hydrogen fueling station 130 (via the IR receiver) to transmit data between the vehicle 120 and the hydrogen fueling station 130. By employing the IR interference shield 150, interference that may negatively affect the IR wireless communication is blocked in a manner that improves reliability of the communication between the vehicle 120 and the hydrogen fueling station 130, thereby improving the overall effectiveness and efficiency of the hydrogen refueling process.

Figure 2A:
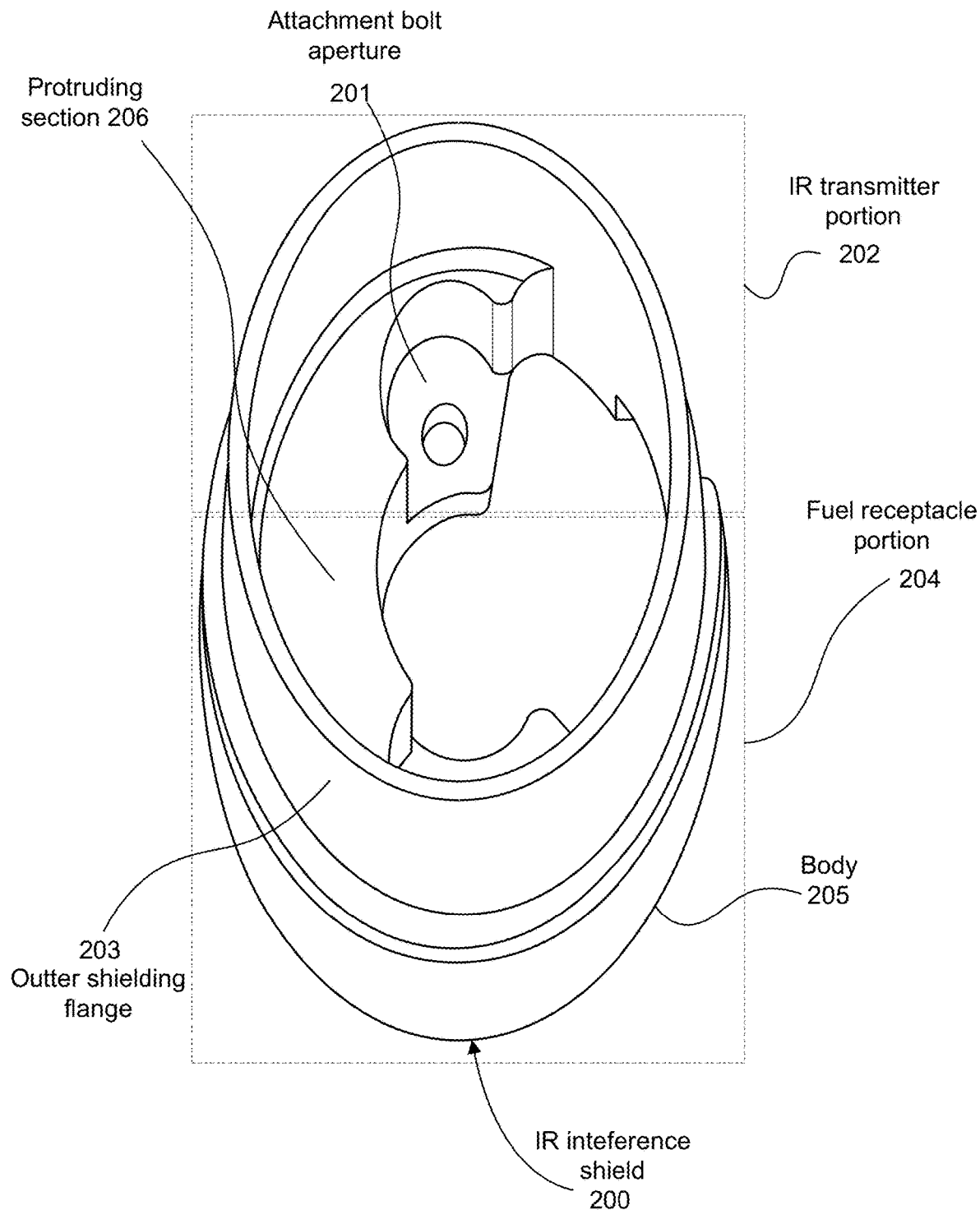
FIG. 2A depicts an example configuration of an IR interference shield, in accordance with an embodiment of the technology disclosed herein.

Referring now to FIG. 2A, the IR interference shield 200 is depicted to prominently illustrate the structure of the apparatus. Further, in the illustrated example, the IR interference shield 200 has a primary member, referred to herein as the body 205. The body 205 is substantially circular in geometric shape and can be considered to comprise the bottom (or base) of the apparatus. It should be appreciated that the geometric shape of the body 205 shown in FIG. 2 is not intended to be limiting, and the IR interference shield 200 can be configured to have another geometric form (e.g., triangular, quadrilateral, and the like) as deemed necessary and/or appropriate.

In some implementations, the IR interference shield 200 is constructed from a material that is substantially rigid and non-reflective that does not allow IR radiation to pass through, such as plastic (with anti-reflective coating), rubber, and the like. Accordingly, the IR interference shield 200, when positioned proximate to the IR communication interface between the vehicle and the hydrogen fueling station can block various sources of interference such as extraneous IR signals, light, and dust particles.

As shown, the IR interference shield 200 is configured with an opening, (also referred to herein as an aperture) to allow some components to be uncovered, while having protruding sections (e.g., protruding section 206) that serve as a protective cover over other areas near the vehicle's receptacle. One portion of the aperture is shown as fuel receptacle portion 204. The hole allows a receptacle to extend through the body 205 via the fuel receptacle portion 204. That is, the fuel receptacle portion 204 has dimensions that enable the vehicle's receptacle to fit though that section of the aperture and allows the bulk of the IR interface shield 200 (e.g., outer shielding flange) to fit around the receptacle (which is extending though the center of the shield). Also, one or more IR transmitters can fit though another portion of the opening in the shield 200, namely the IR transmitter portion 202.

In addition, the IR interference shield 200 includes an outer shielding flange 203. The outer shielding flange 203 can be configured as a protruded ridge, lip, or rim, that extends from the body 205 along its outer circumference. The outer shielding flange 203 serves to increase attachment strength, and attachment/transfer of contact force with another object. The IR interference shield 200 can also provide stabilization and guidance of the movements of components, such as guiding the nozzle into the receptacle. A key aspect of the outer shielding flange 203 is that it is distinctly structured to block interference of elements that can impact IR signals as they are transmitted from the one or more IR transmitters (located within the IR transmitter portion 202) to an IR receiver on a fuel nozzle (shown in FIG. 3) being used to refuel the vehicle. The outer shielding flange 201 extends to cover an area surrounding the receptacle, illustrated as the fueling IR interface 140, such that interference to the IR signals in the area of the interface 140 (e.g., within IR wireless communication range between the hydrogen fueling station 130 and the vehicle 120) is blocked. Restated, the IR interference shield 200 acts as a shield for the IR transmitter, as the outer shielding flange 203 covers otherwise exposed areas near the vehicle's receptacle, and thereby blocks interference. The IR interference shield 200 also includes an attachment bolt aperture 201 such that the IR interference shield 200 can be attached (and possibly retrofitted) onto an existing receptacle of the vehicle using a fastening mechanism, such as a bolt or a screw.

Figure 2B:
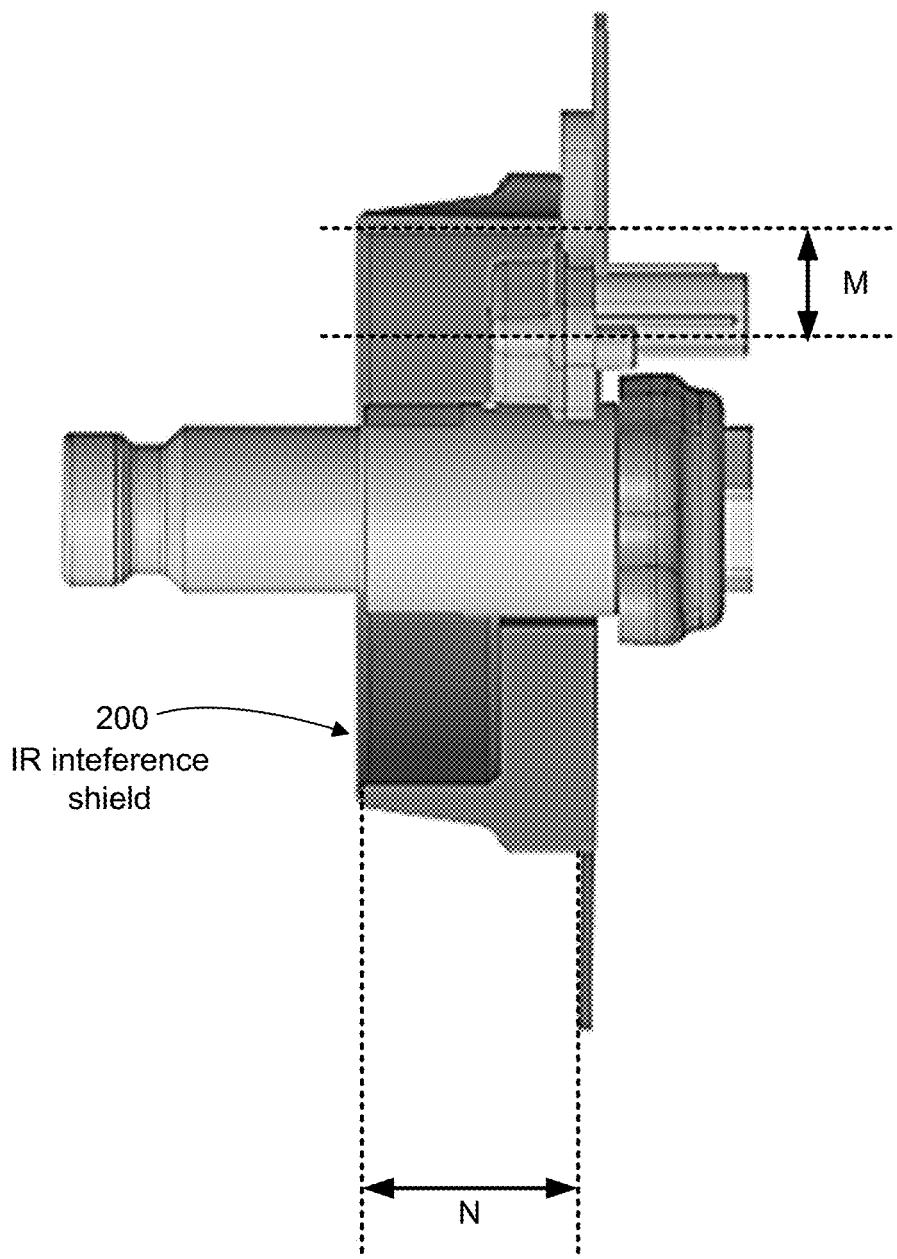
FIG. 2B depicts an example mounted configuration of an IR interference shield, in accordance with an embodiment of the technology disclosed herein.

FIG. 2B is a perspective view of the IR interference shield 200 in a mounted configuration. The perspective view in FIG. 2B illustrates an example of the structure and dimensions of the IR interference shield 200 as it mechanically interacts with a vehicle's hydrogen fueling components, namely the IR transmitter and hydrogen fueling receptacle. In other words, FIG. 2B depicts an example configuration of the IR interface shield 200 in operation. The IR interference shield 200 is structured to be attached, or mounted, onto the vehicle's receptacle (described in detail above in reference to FIG. 2A). As seen in FIG. 2B, in this mounted configuration, the vehicle's receptacle extends though the IR interference shield 200 in a manner that allows the bulk of the IR interface shield 200 (e.g., outer shielding flange) to fit around the receptacle (which is extending though the center of the shield). For example, FIG. 2B illustrates that the IR interference shield 200 can have a width N (e.g., approximately 18 mm) that surrounds the exterior circumference of a section of the receptacle. The remaining portion of the receptacle is not covered, as the length of the receptacle is typically greater than the width N of the IR interface shield 200.

FIG. 2B also illustrates that in the mounted configuration, as the IR interface shield 200 surrounds the receptacle, there are portions of the shield's 200 body that extend at a height above and below the receptacle. Particularly, the portions of the IR interface shield 200 that extend above the receptacle are structured to cover the IR transmitter. As an example, the IR interface shield 200 can be structured to extend at a height M (e.g., approximately 34 mm), or distance, from the IR transmitter. The height M of the IR interference shield 200 can be a determined dimension which ensures that IR signals emitted from the IR transmitter at effective angles (e.g., signals that are intended to be communicated) are not blocked, thereby increasing the effectiveness of the shield 200 in blocking interference without interrupting the IR communication necessary for hydrogen refueling. The IR transmitter can be essentially inserted into the IR interface shield 200 (via the IR transmitter portion 202 shown in FIG. 2A), in a manner that allows the shield's 200 body to cover a section of the IR transmitter and block interference that can impact IR signals as they are transmitted from the IR transmitter to an IR receiver on a fuel nozzle (shown in FIG. 3) being used to refuel the vehicle.

Figure 3:
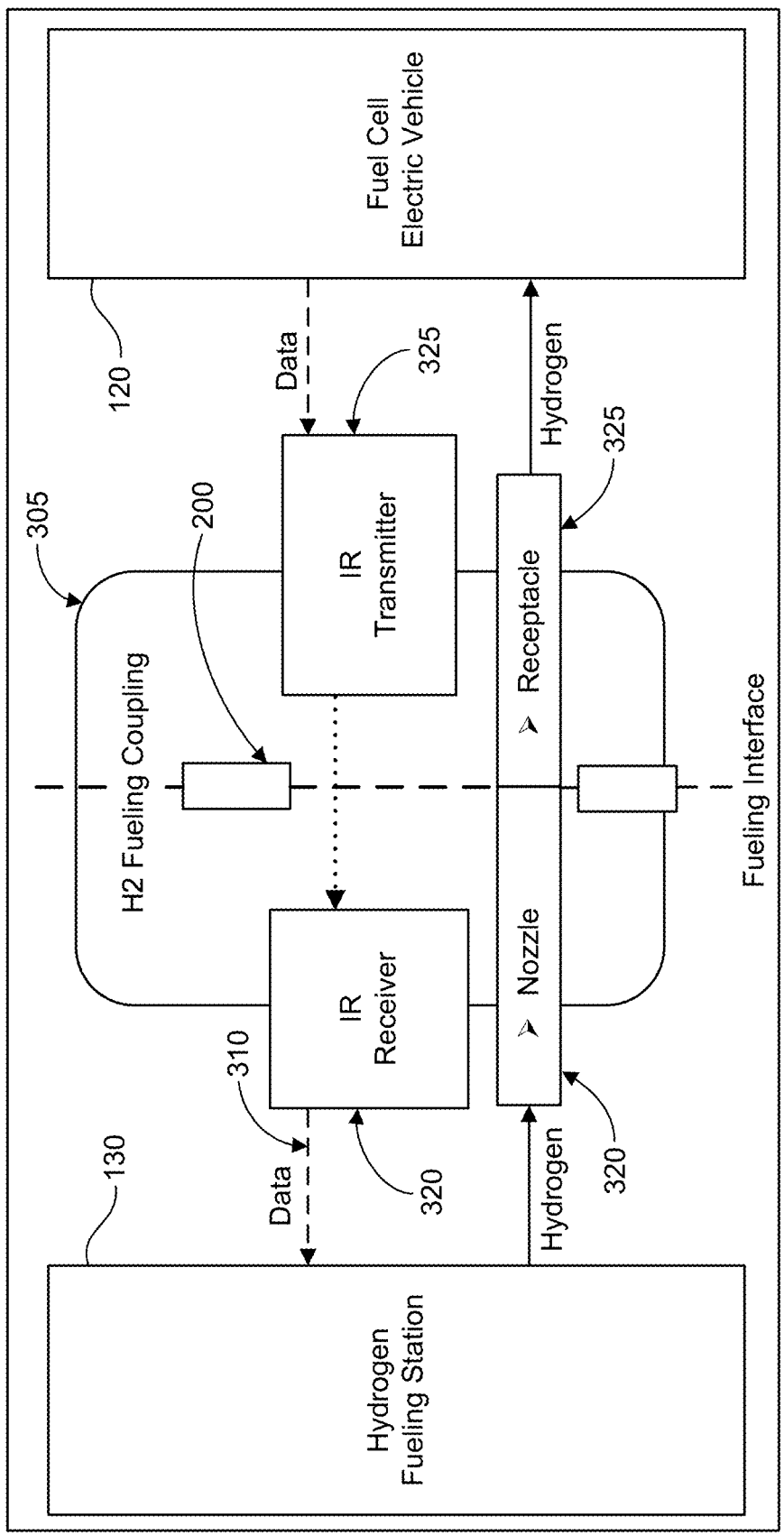
FIG. 3 depicts a schematic representation of an interaction, for example during hydrogen refueling, between a hydrogen fueling station and a vehicle utilizing the IR interference shield shown in FIG. 2A, in accordance with one embodiment of the systems and methods described herein.

FIG. 3 illustrates an example of an interaction that may take place, for example during hydrogen refueling, between the hydrogen fueling station 130 and a FCEV 120 utilizing the IR interference shield 200. Hydrogen fueling is critical to the success of electric vehicles, such as FCEV 120. There are numerous factors that contribute to successful hydrogen fueling. For instance, a few factors are that fueling should be within hydrogen storage system limits, and the fueling rate and driving range should be acceptable to customer. Moreover, effective wireless communication, for instance between the FCEV 120 and the hydrogen fueling station 130, is also a contributing factor to the success of hydrogen fueling. In operation, there is both a mechanical connection and a wireless communication connection, illustrated as hydrogen fueling coupling 305, that is established between the hydrogen fueling station 130 and the FCEV 120 during hydrogen refueling. With respect to the mechanical connection, a nozzle 315 (which is a component of the hydrogen fueling station 130 that is used to dispense the hydrogen fuel from the hydrogen fueling station 130 to the FCEV 120) can be stably received by a receptacle 125 of the FCEV 120. Thus, by physically inserting the nozzle 315 into the receptacle 125, there is a mechanical coupling between the hydrogen fueling station 130 and the FCEV 120 that can be used to deliver the hydrogen fuel to a hydrogen tank of the FCEV 120.

With respect to the wireless communication connection, an IR transmitter 325 of the FCEV 120 is communicatively coupled to an IR receiver 320 of the hydrogen fueling station 130 during refueling. In some implementations, the IR transmitter 325 is attached to the receptacle 125. The IR transmitter 325 and the IR receiver are coupled and communicate data 310 wirelessly in accordance with a wireless IR technology, such as Infrared Data Association (IrDA) standard protocol. The IR wireless capabilities allow the IR transmitter 325 and the IR receiver 320 to establish a short distance, low-to-medium data throughput, wireless communication channel between each other and ultimately supports communication between the FCEV 120 and the hydrogen fueling station 130. For example, while the FCEV 120 is refueling at the hydrogen fueling station 120, the IR transmitter 325 can transmit IR signals that convey data 310, and the IR signals are received by the IR receiver 320. The data 310 can be information that is particularly pertinent to hydrogen fueling, such as the specifications and operational details of the vehicle and/or fueling tank, refueling rate, current fueling level of the hydrogen tank, and state of charge. Thus, having a stable and non-impeded hydrogen fueling coupling 305, including the IR wireless communication, is an important aspect of hydrogen refueling. That is, having stable wireless communication between the IR transmitter 325 and the IR receiver 320, with significantly reduced (or no) interference to the IR signals, can ensure that the data 310 is successfully communicated in a manner that provides the hydrogen fueling station 130 with the appropriate vehicle and/or tank information used for improving fueling. Thus, by employing the IR interference shield 200, the data 310 can be processed by the hydrogen fueling station 130 to effectuate a fast and efficient fueling of the FCEV's 120 hydrogen fueling system to a high state of charge (SOC), without violating the storage system operating limits of the FCEV's 120 internal hydrogen tank temperature or pressure.

Also, FIG. 3 illustrates that the IR interference shield 200 is particularly situated at the hydrogen fueling coupling 305. For instance, the IR interference shield 200 can be mounted onto the FCEV's 120 receptacle 125. By installing the IR interference shield 200 at the point of coupling, the distinct structure of the IR interference shield 200 can effectively block light, extraneous signals, dust particles, and other contaminants that may interfere with the wireless communication connection. The IR interference shield 200 is designed with protruding surfaces, namely flanges, that cover substantial portions of the fueling interface in order to block IR interference, while having openings to allow the components that require free space and accessibility, namely the receptacle 125 and the IR transmitter to be 325, to remained uncovered.

Figure 4:
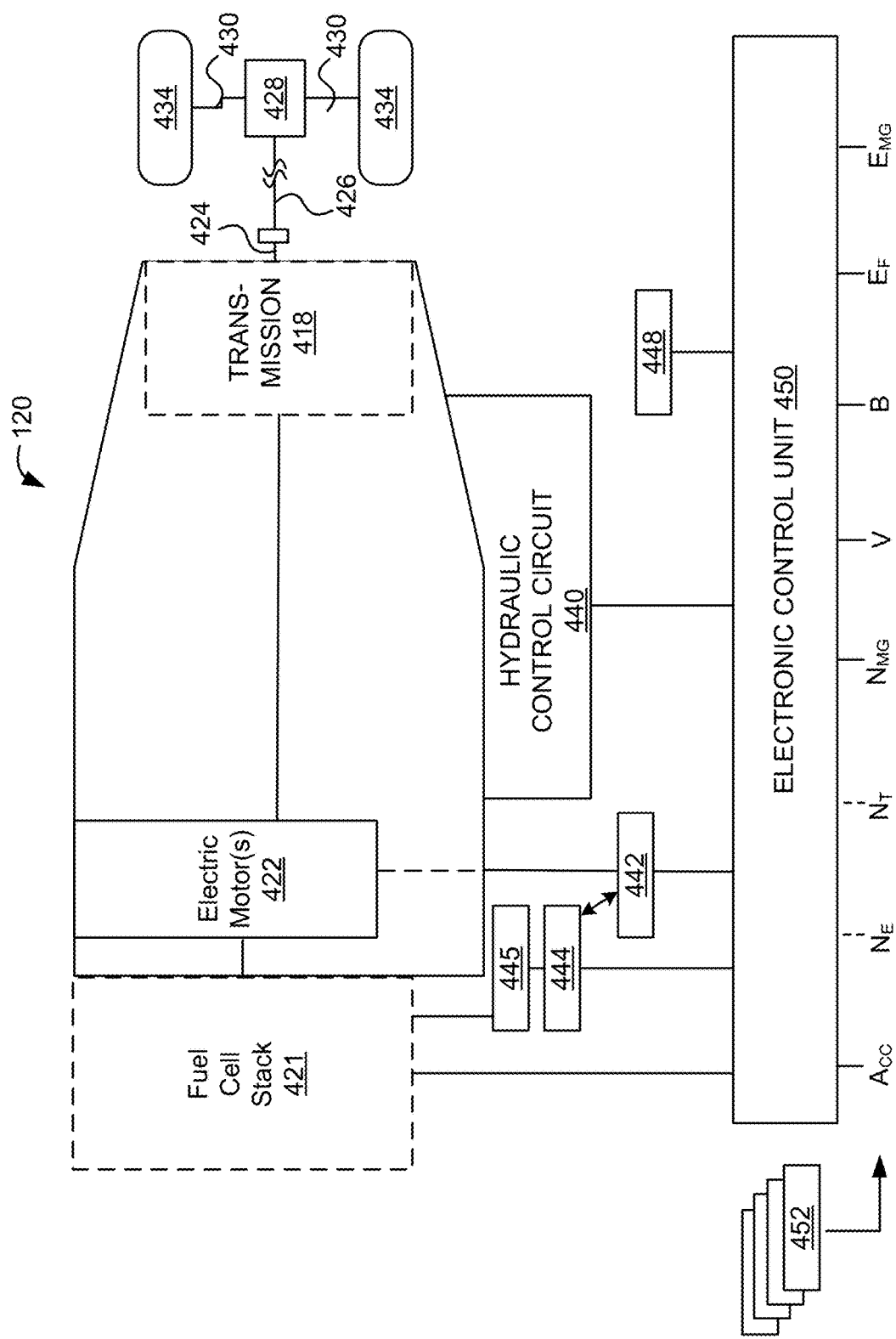
FIG. 4 is a schematic representation of an example vehicle with which embodiments of the hydrogen refueling and the IR interference shield disclosed herein may be implemented.

An example vehicle in which embodiments of the disclosed technology may be implemented is illustrated in FIG. 4. Although the example described with reference to FIG. 1 is described as a fuel cell electric vehicle (FCEV), the IR interference shield can be implemented in other types of vehicles including, fuel-cell vehicles, hybrid electric vehicles, or other vehicles.

FIG. 4 illustrates a drive system of a fuel cell electric vehicle 120, also illustrated in FIG. 1, that may include a hydrogen fuel cell stack 421, which is powered by hydrogen, and one or more electric motors 422, which receive electric power from the hydrogen fuel cell stack 421, as sources of motive power. Driving force generated by the electric motors 422 can be transmitted to one or more wheels 434 via, a transmission 418, a differential gear device 428, and a pair of axles 430.

Vehicle 120 may be driven/powered with the electric motor(s) 422 as the drive source for travel. For example, a travel mode may be an EV travel mode that uses the electric motor(s) 422 as the source of motive power. Thus, in EV travel mode, vehicle 120 is powered by the motive force generated by the electric motor 422. In some implementations, another travel mode may be a hybrid electric vehicle (HEV) travel mode that uses the electric motor(s) 422 and an engine (not shown) as the sources of motive power.

As alluded to above, electric motor 422 can be used to provide motive power in vehicle 120 and is powered electrically via a battery 444 (in addition to the fuel cell stack 421). Battery 444 may be implemented as one or more batteries or other power storage devices including, for example, lead-acid batteries, lithium ion batteries, capacitive storage devices, and so on. Battery 444 may be charged by a battery charger 445. Battery 444 may also be charged by the electric motor 422 such as, for example, by regenerative braking or by coasting during which time motor 422 operate as generator.

Electric motor 422 can be powered by battery 444 and/or the fuel cell stack 421 to generate a motive force to move the vehicle 120 and adjust vehicle speed. Electric motor 422 can also function as a generator to generate electrical power such as, for example, when coasting or braking. Battery 444 may also be used to power other electrical or electronic systems in the vehicle. Electric motor 422 may be connected to battery 444 via an inverter 442. Battery 444 can include, for example, one or more batteries, capacitive storage units, or other storage reservoirs suitable for storing electrical energy that can be used to power the electric motor 422. When battery 444 is implemented using one or more batteries, the batteries can include, for example, nickel metal hydride batteries, lithium-ion batteries, lead acid batteries, nickel cadmium batteries, lithium-ion polymer batteries, and other types of batteries.

An electronic control unit 450 (described below) may be included and may control the electric drive components of the vehicle as well as other vehicle components. For example, electronic control unit 450 may control inverter 442, adjust driving current supplied to electric motor 422, and adjust the current received from electric motor 422 during regenerative coasting and braking As a more particular example, output torque of the electric motor 422 can be increased or decreased by electronic control unit 450 through the inverter 442.

As alluded to above, vehicle 120 may include an electronic control unit 450. Electronic control unit 450 may include circuitry to control various aspects of the vehicle operation. Electronic control unit 450 may include, for example, a microcomputer that includes a one or more processing units (e.g., microprocessors), memory storage (e.g., RAM, ROM, etc.), and I/O devices. The processing units of electronic control unit 450, execute instructions stored in memory to control one or more electrical systems or subsystems in the vehicle. Electronic control unit 450 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS, ESC, or regenerative braking system), battery management systems, and so on. These various control units can be implemented using two or more separate electronic control units or using a single electronic control unit.

In the example illustrated in FIG. 4, electronic control unit 450 receives information from a plurality of sensors included in vehicle 120. For example, electronic control unit 450 may receive signals that indicate vehicle operating conditions or characteristics, or signals that can be used to derive vehicle operating conditions or characteristics. These may include, but are not limited to accelerator operation amount, ACC, a revolution speed, NE, rotational speed, NMG, of the motor 422 (motor rotational speed), and vehicle speed, NV. These may also include NT (e.g., output amps indicative of motor output), brake operation amount/pressure, B, battery SOC (i.e., the charged amount for battery 444 detected by an SOC sensor). Accordingly, vehicle 120 can include a plurality of sensors 452 that can be used to detect various conditions internal or external to the vehicle and provide sensed conditions to engine control unit 450 (which, again, may be implemented as one or a plurality of individual control circuits). In one embodiment, sensors 452 may be included to detect one or more conditions directly or indirectly such as, for example, fuel efficiency, EF, motor efficiency, EMG, hybrid (internal combustion engine 14+MG 12) efficiency, acceleration, ACC, etc.

Additionally, the one or more sensors 452 can be configured to detect, and/or sense position and orientation changes of the vehicle 120, such as, for example, based on inertial acceleration. In one or more arrangements, the electronic control unit 450 can obtain signals from vehicle sensor(s) including accelerometers, one or more gyroscopes, an inertial measurement unit (IMU), a dead-reckoning system, a global navigation satellite system (GNSS), a global positioning system (GPS), a navigation system, and/or other suitable sensors. In one or more arrangements, the electronic control unit 50 receives signals from a speedometer to determine a current speed of the vehicle 120.

In some embodiments, one or more of the sensors 452 may include their own processing capability to compute the results for additional information that can be provided to electronic control unit 450. In other embodiments, one or more sensors may be data-gathering-only sensors that provide only raw data to electronic control unit 450. In further embodiments, hybrid sensors may be included that provide a combination of raw data and processed data to electronic control unit 450. Sensors 452 may provide an analog output or a digital output. Additionally, as alluded to above, the one or more sensors 452 can be configured to detect, and/or sense in real-time. As used herein, the term "real-time" means a level of processing responsiveness that a user or system senses as sufficiently immediate for a particular process or determination to be made, or that enables the processor to keep up with some external process.

Sensors 452 may be included to detect not only vehicle conditions but also to detect external conditions as well. Sensors that might be used to detect external conditions can include, for example, sonar, radar, lidar or other vehicle proximity sensors, and cameras or other image sensors. In some embodiments, cameras can be high dynamic range (HDR) cameras or infrared (IR) cameras. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. Accordingly, the one or more sensors 452 can be configured to acquire, and/or sense driving environment data. For example, environment sensors can be configured to detect, quantify and/or sense objects in at least a portion of the external environment of the vehicle 120 and/or information/data about such objects. Such objects can be stationary objects and/or dynamic objects. Further, the sensors can be configured to detect, measure, quantify and/or sense other things in the external environment of the vehicle 120, such as, for example, lane markers, signs, traffic lights, traffic signs, lane lines, crosswalks, curbs proximate the vehicle 120, off-road objects, etc.

Sensors 452 may be included to detect not only vehicle conditions but also to detect external conditions as well. Sensors that might be used to detect external conditions can include, for example, sonar, radar, lidar or other vehicle proximity sensors, and cameras or other image sensors. In some embodiments, cameras can be high dynamic range (HDR) cameras or infrared (IR) cameras. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. Accordingly, the one or more sensors 452 can be configured to acquire, and/or sense driving environment data. For example, environment sensors can be configured to detect, quantify and/or sense objects in at least a portion of the external environment of the vehicle 120 and/or information/data about such objects. Such objects can be stationary objects and/or dynamic objects. Further, the sensors can be configured to detect, measure, quantify and/or sense other things in the external environment of the vehicle 120, such as, for example, lane markers, signs, traffic lights, traffic signs, lane lines, crosswalks, curbs proximate the vehicle 120, off-road objects, etc.

Figure 5:
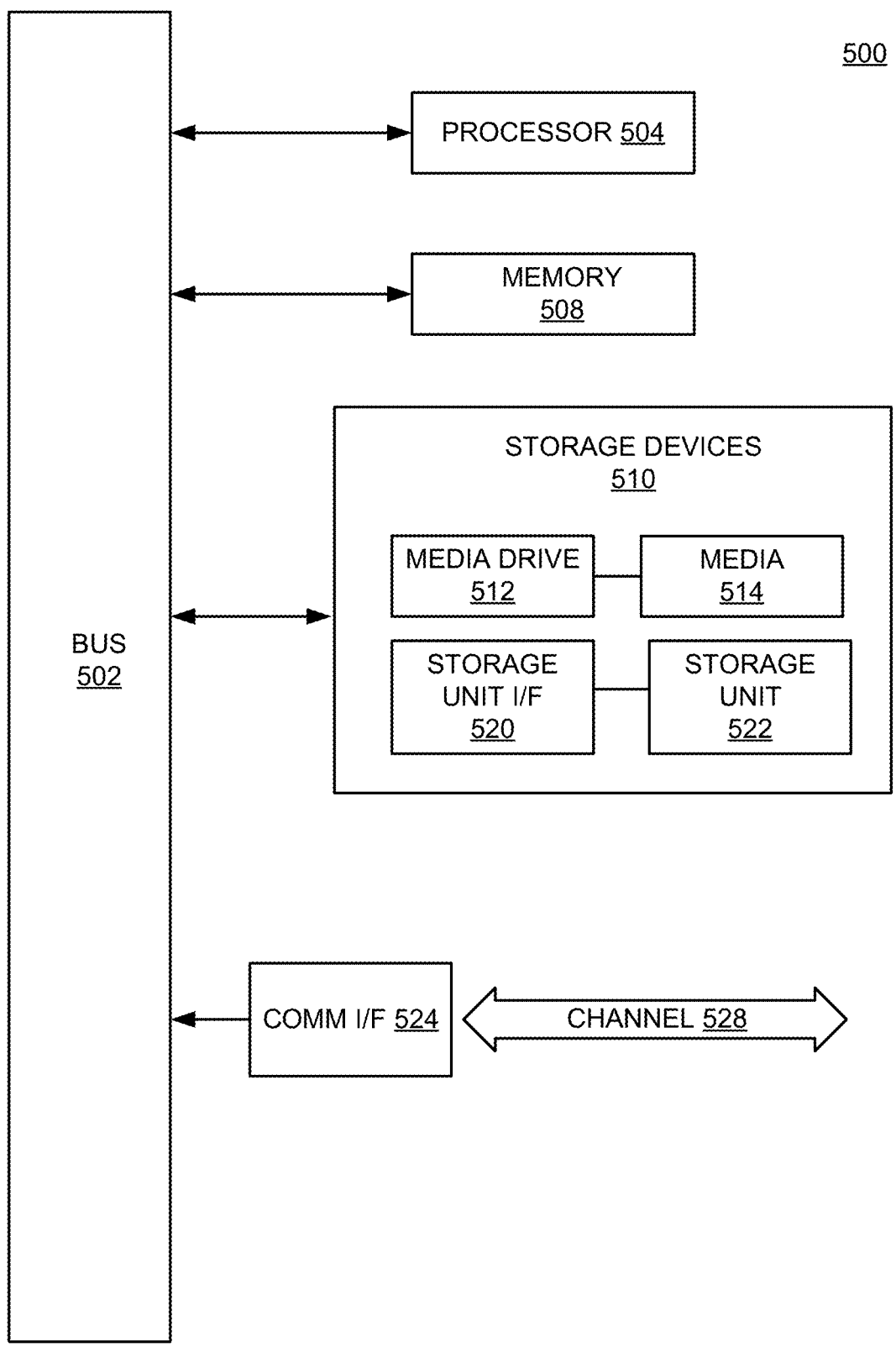
FIG. 5 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionalities can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example—computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 400 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. This can include a processor 504. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 604. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to, or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vehicle comprising:
    a receptacle receiving hydrogen fuel during hydrogen refueling;
    an infrared (IR) transmitter coupled to the receptacle, the IR transmitter transmitting IR signals during hydrogen refueling; and
    an IR interference shield coupled to the receptacle, the IR interference shield comprising:
        a body;
        a flange extending a determined distance from the body along the body's outer circumference, wherein the determined distance is sufficient to cover an area surrounding the receptacle to block external signals from reaching an area within the IR interference shield between an IR receiver of a hydrogen fueling nozzle mated to the receptacle and the IR transmitter;
        a protruding section extending inwardly from at least one of the body's inner circumference and the flange's inner circumference; and
        a contiguous aperture formed by the protruding section and the at least one of the body's inner circumference and the flange's inner circumference, wherein the contiguous aperture comprises a first portion to permit the hydrogen fueling nozzle to mate with the receptacle during the hydrogen refueling and a second portion to expose the IR transmitter to the IR receiver of the hydrogen fueling nozzle.

2. The vehicle of claim 1, wherein the IR transmitter transmits the IR signals to the IR receiver of the hydrogen fueling nozzle via an IR wireless communication channel.

3. The vehicle of claim 2, wherein the IR signals represent data associated with the hydrogen fueling.

4. The vehicle of claim 3, wherein the data is received by a hydrogen fueling station to effectuate control of the hydrogen refueling.

5. The vehicle of claim 1, further comprising:
    an electric motor; and
    a hydrogen fuel cell producing electricity from the hydrogen fuel, wherein the electricity powers the electric motor.

6. The vehicle of claim 1, wherein the vehicle comprises at least one of: an electric vehicle, a fuel cell electric vehicle, a hydrogen ground vehicle, or a heavy duty electric vehicle.

7. The vehicle of claim 1, wherein the determined distance is a distance that is known to allow the IR signals transmitted at a first angle by the IR transmitter during the hydrogen refueling to pass, while covering IR signals transmitted by the IR transmitter at other angles.

8. The vehicle of claim 1, wherein the flange extends to the determined distance above and below the receptacle.

9. The vehicle of claim 1, wherein the flange extends to the determined distance such that signals emitted from the IR transmitter at determined angles for communication during the hydrogen refueling are not blocked.

10. The vehicle of claim 9, wherein the flange extends to the determined distance of 34 millimeters.

11. The vehicle of claim 1, wherein the protruding section comprises an attachment bolt aperture to accommodate and attachment mechanism to attach the IR interference shield to the vehicle.

12. An infrared (IR) interference shield, comprising:
- a body;
- a flange extending a determined distance from the body along the body's outer circumference, wherein the determined distance is sufficient to cover an area surrounding a hydrogen fueling receptacle to block external signals from reaching an area within the IR interference shield between an IR receiver of a hydrogen fueling nozzle mated to the hydrogen fueling receptacle and an IR transmitter coupled to the hydrogen fueling receptacle;
- a protruding section extending inwardly from at least one of the body's inner circumference and the flange's inner circumference; and
- a contiguous aperture formed by the protruding section and the at least one of the body's inner circumference and the flange's inner circumference, wherein the contiguous aperture comprises a first portion to permit the hydrogen fueling nozzle to mate with the hydrogen fueling receptacle during the hydrogen refueling and a second portion to expose the IR transmitter to the IR receiver of the hydrogen fueling nozzle.

13. The IR interference shield of claim 12, wherein the hydrogen fueling receptacle receives hydrogen fuel.

14. The IR interference shield of claim 12, wherein the IR transmitter transmits IR signals during the hydrogen refueling.

15. The IR interference shield of claim 12, wherein the determined distance is a distance that is known to allow the IR signals transmitted by the IR transmitter during the hydrogen refueling to pass, while covering IR transmitter signals transmitted by the IR transmitter at other angles.

16. The IR interference shield of claim 12, wherein the flange extends to the determined distance such that signals emitted from the IR transmitter at determined angles for communication during the hydrogen refueling are not blocked.

17. The IR interference shield of claim 12, wherein the protruding section comprises an attachment bolt aperture to accommodate and attachment mechanism to attach the IR interference shield to a vehicle.

* * * * *